(12) United States Patent
Kim et al.

(10) Patent No.: US 9,495,518 B2
(45) Date of Patent: Nov. 15, 2016

(54) METHOD OF RELIABLY READING DATA STORED IN MULTI-LEVEL CELL (MLC) NON-VOLATILE MEMORY

(75) Inventors: Yong June Kim, Seoul (KR); Hong Rak Son, Anyang-si (KR); Jae Hong Kim, Seoul (KR); Sang Yong Yoon, Seoul (KR); Ki Jun Lee, Seoul (KR); Jung Soo Chung, Seoul (KR); Seong Hyeog Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 894 days.

(21) Appl. No.: 13/407,333

(22) Filed: Feb. 28, 2012

(65) Prior Publication Data

US 2012/0221775 A1 Aug. 30, 2012

(30) Foreign Application Priority Data

Feb. 28, 2011 (KR) ........................ 10-2011-0017565

(51) Int. Cl.
*G06F 12/00* (2006.01)
*G06F 21/00* (2013.01)
*G06F 12/14* (2006.01)
(Continued)

(52) U.S. Cl.
CPC ............. *G06F 21/00* (2013.01); *G06F 11/108* (2013.01); *G06F 11/1012* (2013.01); *G06F 12/00* (2013.01); *G06F 12/14* (2013.01);
(Continued)

(58) Field of Classification Search
CPC .................. G06F 11/1072; G06F 2221/0737; G06F 17/30067; G06F 21/10; G06F 21/16; G06F 11/1068; G06F 11/1076; G06F 13/1668; G06F 21/125; G06F 3/0614; G06F 11/1048; G06F 11/1008; G06F 11/1012; G06F 11/10; G06F 11/108; G06F 2211/109
USPC ................. 711/103, E12.008, 202, E12.001, 711/E12.084, 170, 154, 163; 714/773, 763, 714/780, E11.034, E11.038, 719, 42, 718, 714/E11.02, 733, 752, 766, 786, 799; 365/185.03, 185.18, 185.09, 185.22, 365/189.07, 185.33, 189.15, 200
See application file for complete search history.

(56) References Cited

U.S. PATENT DOCUMENTS 6,732,322 B1 5/2004 Miyauchi et al.
6,792,039 B1 * 9/2004 Fisher .................. G06F 9/5011
375/219

(Continued)

FOREIGN PATENT DOCUMENTS

JP 11-213692 A 8/1999
JP 2008-59679 A 3/2008

(Continued)

OTHER PUBLICATIONS

Office Action issued Feb. 1, 2016, issued by the Japanese Intellectual Property Office in counterpart Japanese Patent Application No. 2012-041220.

*Primary Examiner* — Yaima Rigol
*Assistant Examiner* — Edward Waddy, Jr.
(74) *Attorney, Agent, or Firm* — Sughrue Mion, PLLC

(57) ABSTRACT

An apparatus and a method for reading from a non-volatile memory whereby soft decision data is used to determine the reliability of hard decision data. The hard decision data read from the non-volatile memory is de-randomized and the soft decision data read from the non-volatile memory is not de-randomized. Using the soft decision data, the hard decision data is decoded.

21 Claims, 16 Drawing Sheets

(51) Int. Cl.
  *G11C 11/00* (2006.01)
  *G11C 11/56* (2006.01)
  *G11C 16/26* (2006.01)
  *G11C 16/34* (2006.01)
  *G06F 11/10* (2006.01)

(52) U.S. Cl.
  CPC .......... *G11C 11/00* (2013.01); *G11C 11/5642* (2013.01); *G11C 16/26* (2013.01); *G11C 16/3418* (2013.01)

(56) References Cited

U.S. PATENT DOCUMENTS

| | | | |
|---|---|---|---|
| 8,169,825 B1* | 5/2012 | Shalvi | G11C 11/56 365/185.09 |
| 2006/0174184 A1* | 8/2006 | Stroud | G11B 20/1866 714/800 |
| 2007/0186137 A1* | 8/2007 | Choi | H03M 13/27 714/753 |
| 2008/0055990 A1 | 3/2008 | Ishikawa et al. | |
| 2008/0201538 A1 | 8/2008 | Furuichi et al. | |
| 2008/0205145 A1* | 8/2008 | Kanno | G11C 16/3418 365/185.05 |
| 2008/0215798 A1* | 9/2008 | Sharon | G11C 11/5628 711/103 |
| 2009/0016432 A1* | 1/2009 | Limberg | H04L 65/607 375/240.01 |
| 2010/0088574 A1 | 4/2010 | Kim et al. | |
| 2010/0131824 A1* | 5/2010 | Kolze | H03M 13/1515 714/762 |
| 2010/0229007 A1* | 9/2010 | Park | G11C 7/1006 713/193 |
| 2011/0167227 A1* | 7/2011 | Yang | H03M 13/1111 711/154 |
| 2011/0167305 A1* | 7/2011 | Haratsch | G11C 7/02 714/42 |
| 2011/0317488 A1* | 12/2011 | Tseng | G11C 11/5628 365/185.09 |

FOREIGN PATENT DOCUMENTS

| | | |
|---|---|---|
| JP | 2008-204528 A | 9/2008 |
| KR | 10-2001-0005558 A | 1/2001 |
| KR | 10-2010-0039647 A | 4/2010 |
| WO | 2010/019373 A2 | 2/2010 |
| WO | 2010/147246 A1 | 12/2010 |

* cited by examiner

METHOD OF RELIABLY READING DATA STORED IN MULTI-LEVEL CELL (MLC) NON-VOLATILE MEMORY

CROSS-REFERENCE TO RELATED APPLICATIONS

This U.S. non-provisional patent application claims priority under 35 U.S.C. §119 from Korean Patent Application No. 10-2011-0017565, filed on Feb. 28, 2011, the entire contents of which are hereby incorporated by reference.

BACKGROUND

The present disclosure herein relates to semiconductor memory devices, and more particularly, to a flash memory device and a read method thereof.

Semiconductor memory devices are generally classified into volatile memory devices (e.g., DRAMs and SRAMs) and nonvolatile memory devices (e.g., EEPROMs, FRAMs, PRAMs, MRAMs, and flash memories). A volatile memory device loses data stored therein when power supply thereto is interrupted; whereas a nonvolatile memory device retains data stored therein even when power supply thereto is interrupted. In particular, a flash memory device is widely used as a storage medium in a computer system because of its high program speed, low power consumption and large data storage capacity.

In the flash memory device, data states storable in each memory cell may be determined according to the number of bits stored in the memory cell. A memory cell storing 1-bit data per cell is called a single-bit cell or a single-level cell (SLC), and a memory cell storing multi-bit data (i.e., at least 2-bit data) per cell is called a multi-bit cell, a multi-level cell (MLC) or a multi-state cell. The multi-bit cell is advantageous for high integration. However, as the number of bits programmed in each memory cell increases, the reliability decreases and the read failure rate increases.

SUMMARY

According to an aspect of exemplary embodiments, there is provided a method of operating a nonvolatile memory system, the method including: reading hard decision data stored in a non-volatile memory device; de-randomizing the hard decision data using a random sequence; reading soft decision data which indicates a reliability of the hard decision data; and decoding the hard decision data using the soft decision data that has not been de-randomized.

In the exemplary embodiment, the de-randomizing includes combining the hard decision data and the soft decision data with a first random sequence and a second random sequence, respectively, to output de-randomized hard decision data and the soft decision data that has not been de-randomized, and wherein second random sequence only includes zeros.

The method further includes operating a switch in one of a first mode and a second mode, the switch being operable to receive the hard decision data and the soft decision data, wherein the hard decision data is received by a de-randomizer in the first mode and the soft decision data bypasses the de-randomizer in the second mode.

The method further includes operating a switch in one of a first mode and a second mode, the switch being operable to receive the hard decision data and the soft decision data, wherein the hard decision data is output to a logic gate which receives the random sequence and combines the random sequence with the hard decision data to output de-randomized hard decision data in the first mode, and wherein the soft decision data bypasses the logic gate in the second mode.

In yet another exemplary embodiment, there is a memory controller including: a microprocessor; a de-randomizer configured to de-randomize hard decision data in response to a hard decision read command under a control of the microprocessor; and a decoder which decodes the de-randomized hard decision data using soft decision data which indicates a reliability of the hard decision data, wherein the soft decision data received by the decoder has not been de-randomized.

The memory controller may further include a switch which provides the hard decision data to the de-randomizer and which provides the soft decision data to bypass the de-randomizer.

The de-randomizer is configured to receive the hard decision data and the soft decision data, and to combine the hard decision data and the soft decision data with a first random sequence and a second random sequence, respectively, and wherein second random sequence only includes zeros.

In an exemplary embodiment, there is a non-volatile memory system including: a non-volatile memory device including: a non-volatile memory cell array which stores randomized hard decision data; a page buffer which receives randomized hard decision data and soft decision data from the non-volatile memory; and a random data interface which de-randomizes the randomized hard decision data and does not de-randomize the soft decision data, the random data interface including: a random sequence generator which generates a random sequence, a logic gate which combines the random sequence and the randomized hard decision data to output de-randomized hard decision data to an output buffer; a switch which provides the hard decision data received from the page buffer, to the logic gate and which provides the soft decision data received from the page buffer, directly to the output buffer, bypassing the logic gate.

In yet another exemplary embodiment, there is a non-volatile memory system including: a control logic; and a non-volatile memory device including: a non-volatile memory cell array which stores randomized hard decision data; a page buffer reads the randomized hard decision data and soft decision data from the non-volatile memory cell array, and de-randomizes the randomized hard decision data; a random sequence generator which generates a random sequence; a multiplexer which receives the random sequence; wherein the page buffer de-randomizes the randomized hard decision data based on the random sequence received from the multiplexer, and does not de-randomize the soft decision data.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings.

DETAILED DESCRIPTION OF EXEMPLARY EMBODIMENTS

Figure 1A:
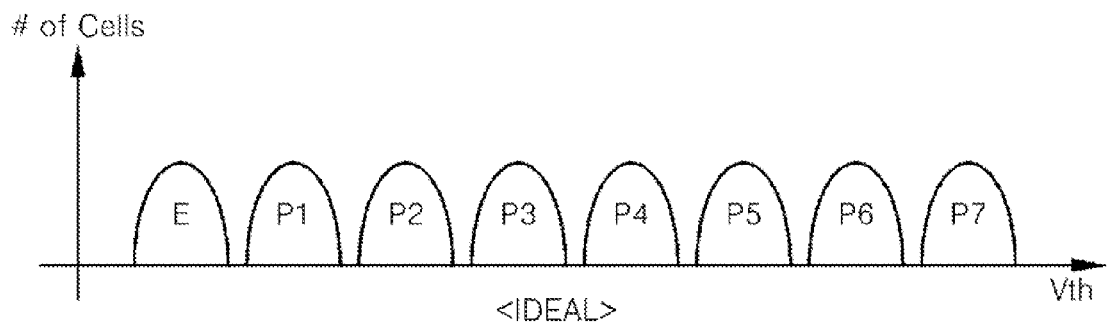
FIG. 1A shows program and erase threshold voltage distributions of 3 bit MLC (multi-level cell) flash memory after normal program operation.

Detailed exemplary embodiments are disclosed herein. However, specific structural and functional details disclosed herein are merely representative for purposes of describing exemplary embodiments. Exemplary embodiments may, however, be embodied in many alternate forms and should not be construed as limited to only the embodiments set forth herein.

Accordingly, while exemplary embodiments are capable of various modifications and alternative forms, embodiments thereof are shown by way of example in the drawings and will herein be described in detail. It should be understood, however, that there is no intent to limit exemplary embodiments to the particular forms disclosed, but to the contrary, exemplary embodiments are to cover all modifications, equivalents, and alternatives falling within the scope of exemplary embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of exemplary embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Exemplary embodiments are described herein with reference to schematic illustrations of idealized embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

FIG. 1A shows program and erase threshold voltage distributions of 3 bit MLC (multi-level cell) flash memory after normal program operation.

Figure 3:
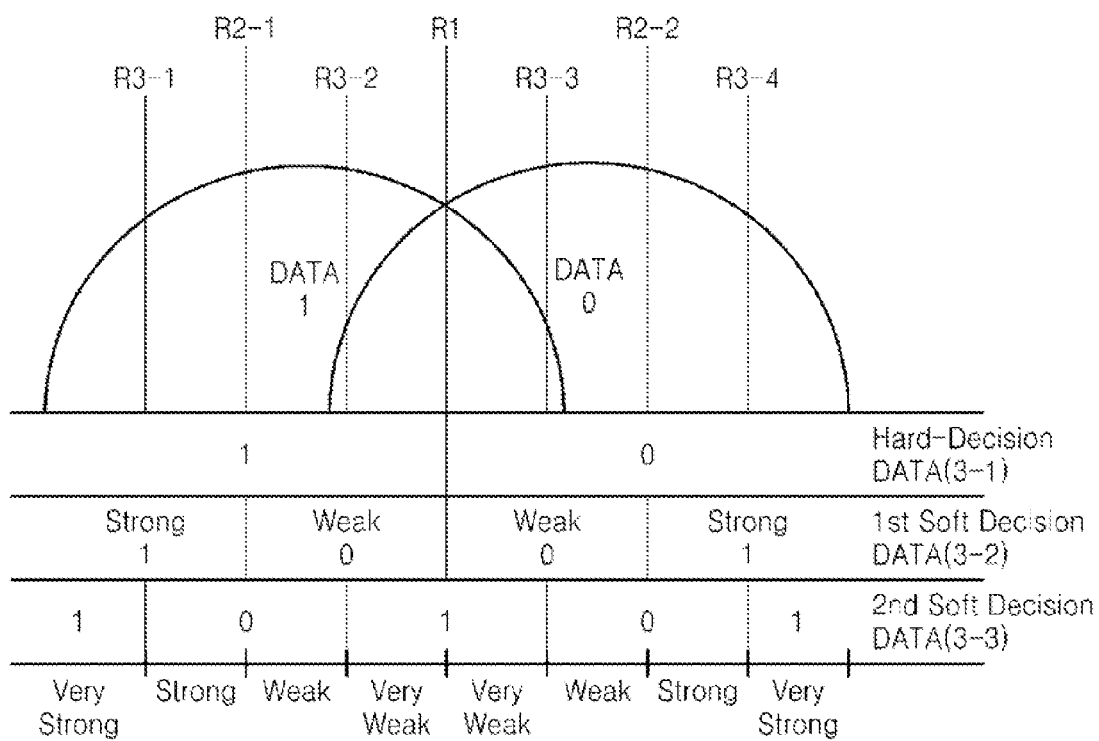
FIG. 3 shows a diagram illustrating a 3-bit soft decision read operation.

In the MLC flash memory device, a memory cell may store multi-bit data (i.e., at least 2-bit data) per cell. For example, if k bits are to be programmed in a memory cell, one of $2^k$ threshold voltages must be present in the memory cell. Due to the minute difference between the electrical characteristics of memory cells, the threshold voltages of memory cells programmed with the same data may generate a desired (or, in the alternative, a predetermined) range of threshold voltage distribution. Threshold voltage distributions may correspond respectively to $2^k$ data values that may be generated by k bits. Referring to FIG. 1A, 3 bits MLC flash memory may form one threshold distribution of erase state (E) and seven numbers of threshold distributions of program state (P1, P2, . . . P6, P7). According to FIG. 1A, the distributions do not overlap each other and each distribution corresponds to a corresponding different read voltage level.

Figure 1B:
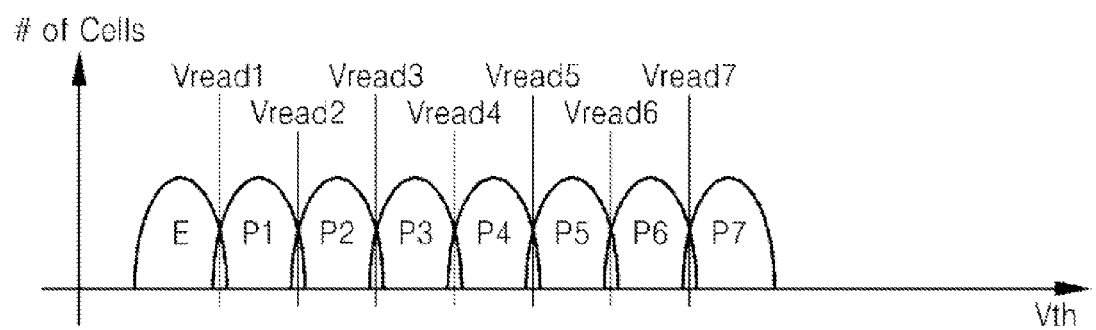
FIG. 1B shows exemplary program and erase threshold voltage distributions of 3 bit MLC(multi-level cell) flash memory after a charge loss.

FIG. 1B shows exemplary program and erase threshold voltage distributions of 3-bit MLC (multi-level cell) flash memory after a charge loss happens.

Through the passage of time, the adjacent threshold voltage distributions may start to overlap each other (FIG. 1B) after programming because of a charge loss, a program disturbance, an erase disturbance, and a back pattern dependency.

The charge loss means electrons trapped by floating gate layer or tunnel oxide layer, are emitted. The charge loss results in the shifting of the threshold distribution towards the left in the drawings. The degradation of tunnel oxide layer because of program and erase cycle increases the charge loss phenomena.

The program disturbance, the erase disturbance, and the back pattern dependency results in the shifting of the threshold distribution towards the right. The program disturbance, the erase disturbance, and the back pattern dependency increase the threshold voltages.

Referring to FIG. 1B, as the erase state, and the program state (P1, P2. . . P7) overlap, read data may include a number of error bits (e.g., several error bits or several tens of error bits). For example, assuming that the read voltage Vread3 is used for read operation, the 'on' state indicates P2 state data and the 'off' state indicates P3 state data. However, in the case of the overlapped portion, even the P3 state corresponds to the 'on' state and even the P2 state corresponds to the 'off' state. As the adjacent threshold voltage distributions overlap each other, read data may include a number of error bits (e.g., several error bits or several tens of error bits).

Figure 2:
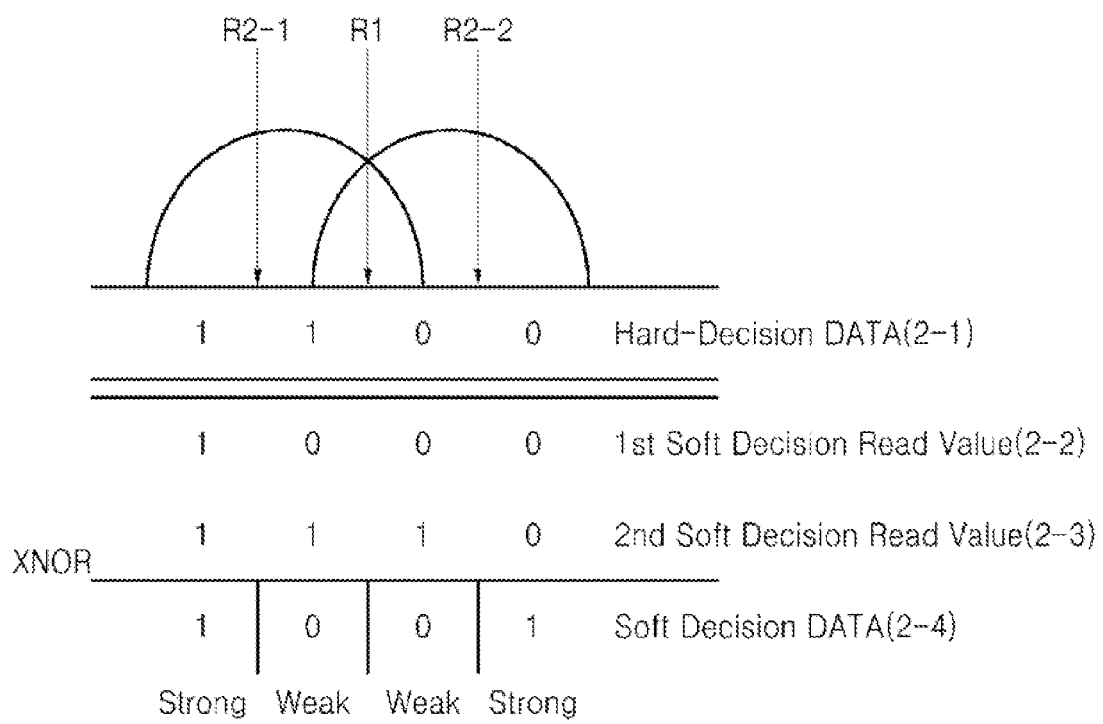
FIG. 2 shows a diagram illustrating a 2-bit soft decision read operation.

FIG. 2 is a diagram illustrating a 2-bit soft decision read operation.

Figure 4:
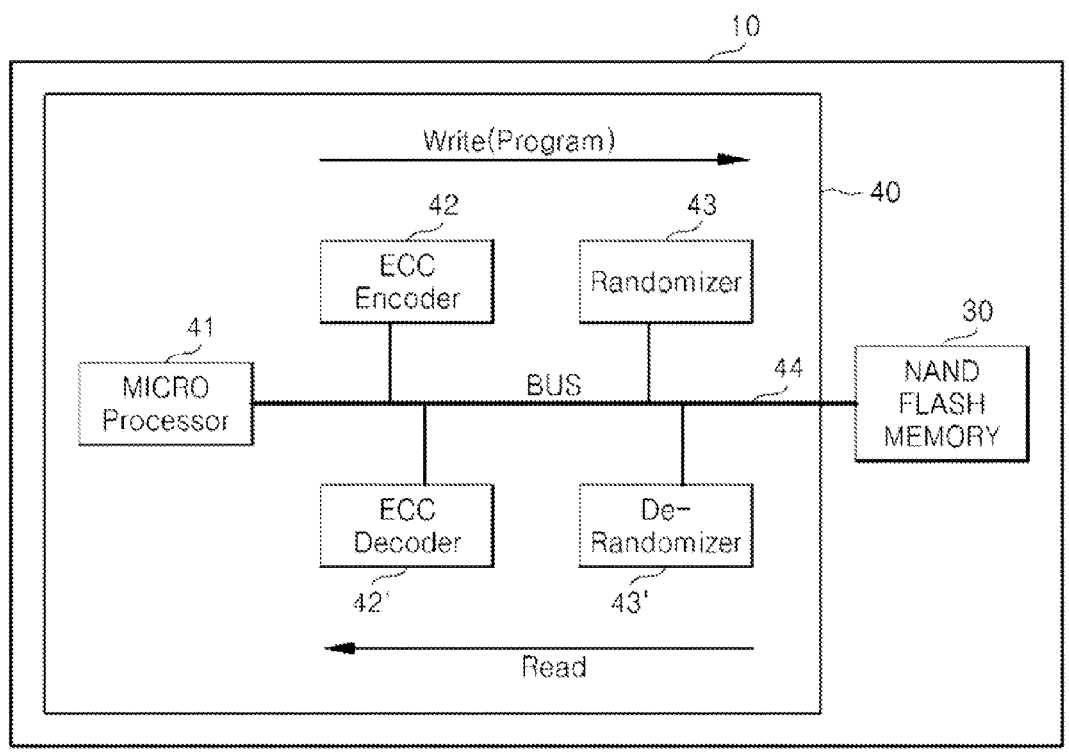
FIG. 4 is a block diagram illustrating a memory system according to an exemplary embodiment.

Referring to FIGS. 1 and 4, ideally, data states programmed in a memory cell maintain a predetermined voltage interval with adjacent data states to secure a sufficient read margin. A predetermined reference read voltage may be set on the basis of ideal data states. According to FIG. 2, a read operation (R1) performed using the reference read voltage is called a hard decision read operation, in response to hard decision command. As will be described below, read commands include hard decision read command ("first read command") and soft decision read command ("second read command") However, each data state may be overlapped and be deformed to an unpredetermined shape in FIG. 1B. It is difficult to distinguish between the deformed data states P3 and P4 by using only a hard decision read operation. In this case, the deformed data states P3 and P4 may be distinguished through a soft decision read operation. As will be described, the reliability data obtained by the soft decision read operation may be provided to the error correction code (ECC) decoder together with the hard decision data, and may be used to correct a possible error bit in the deformed data states P3 and P4.

Referring to FIG. 2, the 2-bit soft decision read operation may include two additional read operations that are performed sequentially on the basis of read voltages (R2-1, R2-2), although hard decision read operation uses R1 read voltage. In hard decision read operation, the data read through hard decision read using R1 may be one bit hard decision data. In the soft decision read operation, the data read through the two read operations may be encoded to generate 1-bit reliability data, i.e., soft decision data, by exclusive NOR operation. The soft decision data (1-bit), as shown in FIG. 2, is encoded by an exclusive NOR operation on the read results of the two read voltages. For example, a first soft decision value (2-2) may be obtained by the read operation using the read voltage R2-1. A second soft decision value (2-3) may obtained by the read operation using the read voltage R2-2. As will be described, flash memory or memory controller can encode the first and the second soft decision values by an exclusive NOR operation and provide one bit soft decision data. The soft decision read operation may generate the reliability information corresponding to the hard decision data. Referring to FIG. 3, in case of 2-bit soft decision data, data 1 indicates that the reliability of the corresponding hard decision data is strong, and data 0 indicates that the reliability of the corresponding hard decision data is weak.

Finally, the hard decision data may be determined as '1' or '0' according to the value of the soft decision data in the ECC decoder. And the read resolution applied to the soft decision read operation may increase for a more accurate data decision. As the read resolution increases, the read/sense count during the soft decision read operation increases.

FIG. 3 shows a diagram illustrating a 3-bit soft decision read operation.

Referring to FIG. 3, the 3-bit soft decision read operation may include six additional read operations that are performed sequentially on the basis of read voltages (R2-1, R2-2, R3-1, R3-2, R3-3, R3-4) although the hard decision read operation uses R1 read voltage.

As described in FIG. 2, the hard decision data is 1 and 0 (3-1) according to FIG. 3. The first soft decision data, 1, 0, 0, and 1 (3-2) is encoded by an exclusive NOR operation on the read results of the two read voltages R2-1, and R2-2. The second soft decision data 1, 0, 1, 0, 1 (3-3) is encoded by an exclusive NOR operation on the read results of the four read voltages R3-1, R3-2, R3-3, and R3-4. The second soft decision data (3-3) may add a reliability information corresponding to the first soft decision data (3-2). The second soft decision data '1' may add strong information to the corresponding the first soft decision data 3-2. he second soft decision data '0' may add weak information to the corresponding the first soft decision data 3-2.

FIG. 4 is a block diagram illustrating a memory system 10 according to an exemplary embodiment.

Referring to FIG. 4, the memory system 10 includes a memory controller 40, non-volatile memory device 30 (ex. flash memory device). The memory controller 40 includes a microprocessor 41, an ECC encoder 42, ECC decoder 42', randomizer 43 and de-randomizer 43'. Each one of the aforementioned components (41, 42, 42', 43, and 43') is electronically connected to a bus 44.

The microprocessor 41 may generally control an operation of the memory controller 40. The microprocessor may control, for example, through a software, such as firmware which can be operated under a control of the microprocessor

41. The microprocessor 41 may interpret command from a host (i.e. computer system) and generally control the memory controller 40 based on the command interpretation.

Referring to FIG. 4, upper arrow (→) shows a data programming (or writing) process into the non-volatile memory device 30. The lower arrow shows a data reading process from the non-volatile memory device 30.

In case of the data programming process, the ECC (error correction code) encoder 42 is configured to encode data from host interface which is an interface between host and memory system 10. The ECC encoder 42 generates encoded data which is parity bits added to the data. The encoded data is provided to randomizer 43. The ECC decoder 42' may include the circuitry, the system, or the device to correct the error bit.

The randomizer 43 is configured to transfer input data pattern in order to make the data pattern (i.e. 1 or 0, P1 state, P2 state, P3 state) stay stable at random, i.e., randomly equalize the data pattern. The randomizer 43 provides non-volatile memory device 30 with randomized data which are random data.

While a memory device has more density, interference between memory cells may be increased. Neighboring cells' states may increase the interference or decrease the interference. Storing the random data may minimize the interference.

Normally, non-volatile memory device 30 has interferences such as a program voltage disturbance, a pass voltage disturbance, a coupling effect between floating gate and a back pattern dependency effect. The random data programming into non-volatile memory device 30 minimize such interferences.

Referring to FIG. 4, in case of the data reading process, the random data is already stored in the non-volatile memory device 30. The random data read from non-volatile memory device 30 may be restored to original data which is input data from the host. According to an exemplary embodiment, two types of read operation include the hard decision read operation and the soft decision read operation, as described above in FIGS. 2 and 3.

In case of hard decision read operation, the random data are read from the non-volatile memory device 30, which is called hard decision data. The hard decision data may be restored to the original data by de-randomizer 43'.

In case of soft decision read operation, the soft decision read operation may not read the programmed data, or random data. The soft decision read operation is performed to generate the reliability information corresponding to the hard decision data. In other words, the soft decision read operation may use the different read voltages from the hard decision read voltage and provide the reliability information corresponding to the hard decision data. Referring to FIG. 3, in case of 2 bit(s) soft decision data, data 1 indicates that the reliability of the corresponding hard decision data is strong, and, data 0 indicates that the reliability of the corresponding hard decision data is weak. If the soft decision data may be restored by de-randomizer 43', the reliability information corresponding to the hard decision data may be distorted. Thus, when the soft decision read operation is performed or when the soft decision read command is applied to the non-volatile memory device 30, the soft decision data may bypass the de-randomizer 43' under the control of the microprocessor 41. The soft decision data may not restored by de-randomizer 43' under the control of the microprocessor 41. As will be described, the de-randomizer 43' may be a separate circuit or a separate device from the randomizer 43. Or the de-randomizer 43' and the randomizer 43 are located in the same circuit or same device.

The restored or de-randomized data and bypassing soft decision data are provided into the ECC decoder 42'.

The ECC decoder 42' is configured to check the error bits and correct the error bits using de-randomized data and soft decision data that has bypassed the de-randomizer 48'. ECC decoder 42' may include the circuitry, system, or device in order to correct the error bits.

According to an exemplary embodiment, ECC decoder 42' may correct the error bits using soft decision data which is the reliability information for the hard decision data. Thus, error correction performance may be increased.

The ECC encoder 42 and the ECC decoder 42' may use, for example, low density parity check (LDPC) code, turbo code, recursive systematic (RS) code, trellis-coded modulation (TCM), Block coded modulation (BCM).

Figure 5A:
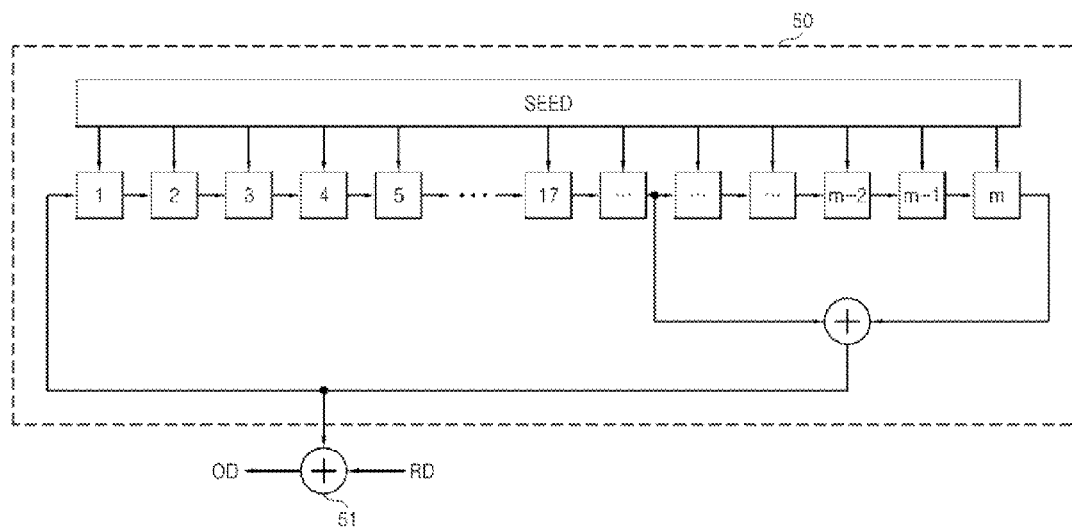
FIG. 5A is a block diagram illustrating a detailed structure of a randomizer according to an exemplary embodiment.

FIG. 5A is a block diagram illustrating a detailed structure of a randomizer 43 according to an exemplary embodiment.

Referring to FIG. 5A, the randomizer 43 may include random sequence generator 50 and exclusive XOR gate 51. The random sequence generator 50 may generate a random sequence (RD) using linear feedback shift register (LFSR). The linear feedback shift register (LFSR) may generate the random sequence (RD) using initial values, for example, seed. The random sequence (RD) may be a binary bit for example, 1 or 0. The random sequence (RD) may have $(2^m-1)$ period when the numbers of the linear feedback shift registers are m. The seed may be installed in the linear feedback shift registers at the beginning. The seed may be determined by, for example, a page address or a block address.

Referring to FIG. 5A, XOR gate 51 may operate XOR operation using the random sequence (RS) and the original data (OD). The random sequence may be generated by the random sequence generator 50. The original data (OD) may be received from the host.

Figure 5B:
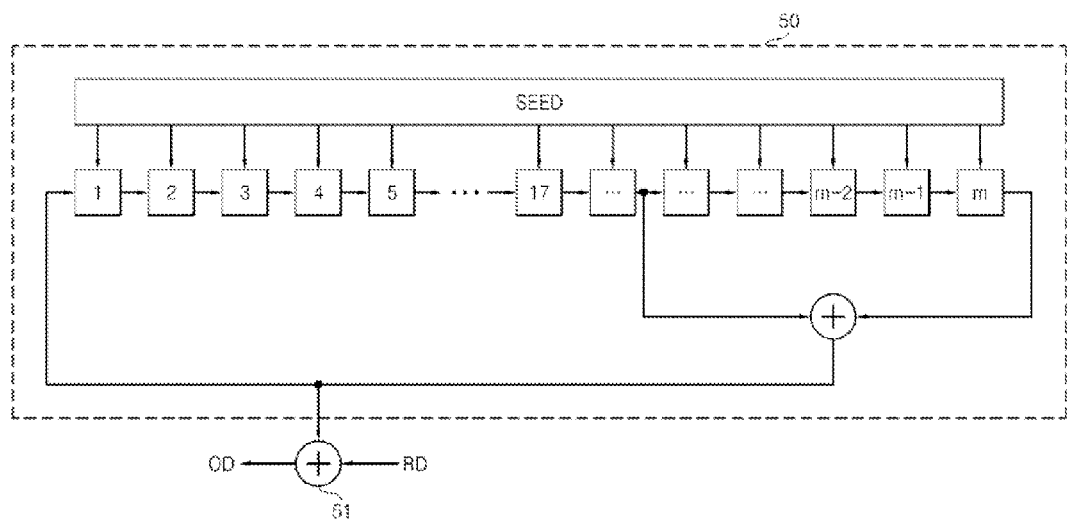
FIG. 5B is a block diagram illustrating a detailed structure of a de-randomizer according to an exemplary embodiment.

FIG. 5B is a block diagram illustrating a detailed structure of a de-randomizer 43' according to an exemplary embodiment.

Referring to FIG. 5B, the de-randomizer 43' may include random sequence generator 50 and XOR gate 51 such as the randomizer 43. The randomizer 43 and the de-randomizer 43' may be composed in one circuit or one device. The randomizer 43 and the de-randomizer 43' are located in a separate circuit or a separate device. Based on an exemplary embodiment, the randomizer 43 and de-randomizer 43' may be as one circuit or one device or separate two circuits or separate two devices. The randomizer 43 and the de-randomizer 43' may use same seed. The de-randomizer 43' is configured to restore the hard decision data which is in the form of random data (RD) to the original data (OD) using the random sequence used by the randomizer 43.

The randomizer 43 and the de-randomizer 43' may include the random sequence generator 50 and XOR gate 51. The data path of the de-randomizer 43' may be opposite to the data path of the randomizer 43.

Figure 5C:
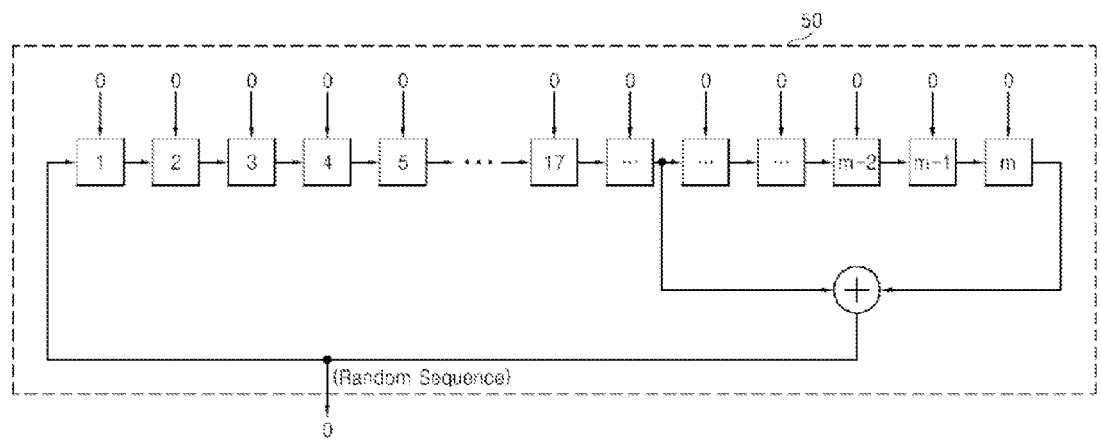
FIG. 5C is a block diagram illustrating a detailed structure of a de-randomizer according to another exemplary embodiment.

FIG. 5C is a block diagram illustrating a detailed structure of a de-randomizer according to another exemplary embodiment. As described above, if the soft decision data may be restored by de-randomizer 43', the reliability information corresponding to the hard decision data may be distorted. All the linear feedback shift registers may be set to zero as a seed under the control of microprocessor 41 when soft decision read operation is performed. The random sequence generator 50 may generate all zero as the random sequence (RS). The all-zero random sequence (RS) may prevent the soft decision read data from being restored. Thus soft decision read data may not be restored or not de-randomized.

Figure 6:
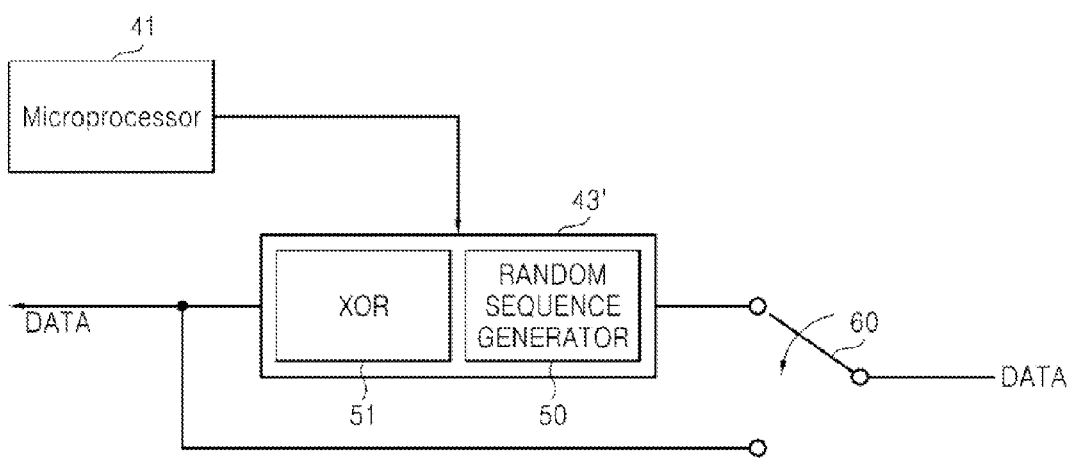
FIG. 6 is a block diagram illustrating a detailed structure of a de-randomizer of non-volatile memory system of FIG. 4 according to another exemplary embodiment.

FIG. 6 is a block diagram illustrating a detailed structure of a de-randomizer 43' of non-volatile memory system 10 according to another exemplary embodiment.

Referring to FIG. 6, de-randomizer 43' may further include a switch 60 which is switched when the soft decision data is read. The microprocessor 41 may provide soft decision read command or any signals indicating the soft decision read operation to the de-randomizer 43' when the soft decision read operation is performed. Under the control of the microprocessor 41, the switch 60 may be switched for the purpose of preventing the de-randomizer 43' from receiving the soft decision read data, i.e., for the purpose of bypassing the derandomizer 43'. For example, the switch 60 may be switched in response of a switching signal or a control signal from the microprocessor 41 and the switch may enable the soft decision read data to bypass the de-randomizer 43'.

In another exemplary embodiment, the switch 60 may be automatically switched at a specific period of time after the soft decision read command is applied to the de-randomizer 43'. The switch 60 may be switched based on a stop signal applied when the soft decision read data is output under the control of the microprocessor 41.

The soft decision data may be provided to ECC decoder 42' without restoring or de-randomizing.

Figure 7:
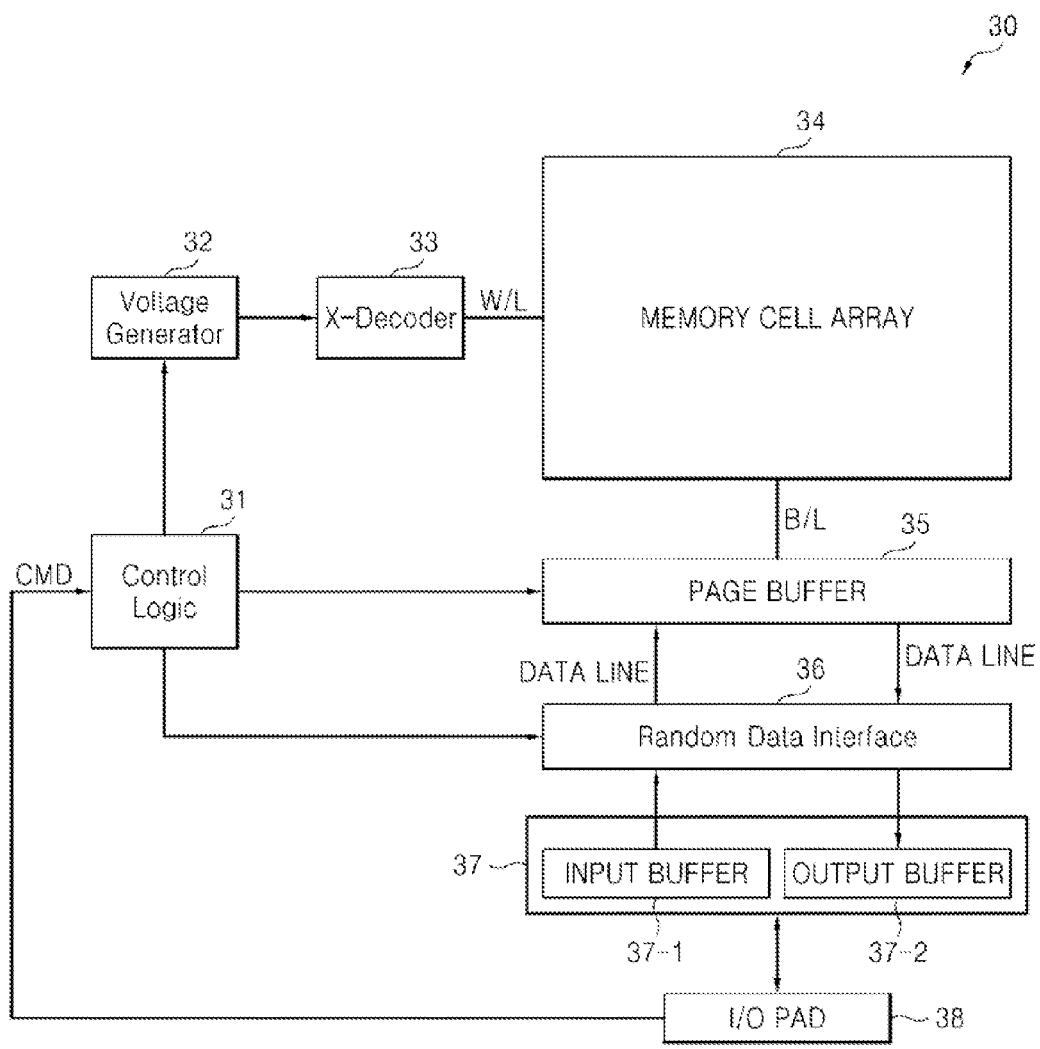
FIG. 7 is a block diagram illustrating non-volatile memory device according to another exemplary embodiment.

FIG. 7 is a block diagram illustrating non-volatile memory device 30 according to another exemplary embodiment.

Referring to FIG. 7, the non-volatile memory device 30 is exemplarily a NAND flash device. However, the non-volatile memory device 30 is not limited to a NAND flash memory. For example, the memory cell array may be configured to include a NOR flash memory, a hybrid flash memory with a hybrid of at least two types of memory cells, or a One-NAND flash memory with a controller embedded in a memory chip. The operation characteristics of the flash memory device may be applicable not only to a flash memory with a charge storage layer including a conductive floating gate, but also to a charge trap flash (CTF) memory with a charge storage layer including a dielectric layer.

Referring to FIG. 7, the non-volatile memory device 30 may include a memory cell array 34, a row decoder (X-decoder) 33, a page buffer 35, a control logic 31, a voltage generator 32, an input buffer and an output buffer 37-1, 37-2, an input/output pad 38, and a random data interface 36.

The memory cell array 34 may include a plurality of word lines (W/L) and a plurality of bit lines (B/L). Each memory cell may store one bit data or M bit data (M being a natural number greater than 2). Each memory cell may include an electron storing layer, for example, floating gate or charge trap layer and may include a variable resistance. The memory cell array 34 may be configured to have single-layer array structure (or two dimension structure) or multi-layer array structure (or three dimension structure).

The control logic 31 may control an overall operation related to a program operation, an erase operation, or a read operation. The control logic may interpret a plurality of commands received from the memory controller 40 and control the operations corresponding to the commands.

The voltage generator 32 may generate word line voltages (i.e., hard decision read voltages and soft decision read voltages) according to operation modes, under the control of the control logic 31.

Row decoder (X-decoder) 33 may select one of the word lines. Under the control of the control logic 31, the row decoder 33 may provide the word line voltages generated by the voltage generator respectively to the selected word line and the unselected word lines.

The page buffer 35 may be controlled by the control logic 31 to operate as a sense amplifier or a write driver according to an operation mode. In hard decision read operation and soft decision read operation, the page buffer 35 operates as a sense amplifier for reading the hard decision read data and soft decision read data from the memory cell array 34.

As will be described below, each of the page buffers PB 35 may include a plurality of latches (see 90-1, 90-2, 90-3, 90-4 of FIG. 9). The plurality of latches 90-1, 90-2, 90-3, 90-4 may latch a plurality of reliability data bits and soft decision data received from the memory cell array 34. The value of the reliability data bits may be determined by encoding the data read through a soft decision read operation Input/output pad 37 and input output buffer 37 form the input and output path of data between the memory controller 40 and the non-volatile memory device 30.

The random data interface 36 may enable the programming data to randomize like the randomizer 43. And the random data interface 36 may enable the hard decision data to de-randomized like the derandomizer 43'. The random data interface 36 may include the random sequence generator 50 and the XOR gate 51. The random data interface 36 may be controlled by the control logic 31.

Under the control of the control logic 31, the random data interface 36 may generate the random data by performing exclusive OR operation using the random sequence and the programming data. The random data may be loaded into the page buffer 35 under the control of control logic 31.

As described above, the read operation may include the hard decision read operation in response to the hard decision read command and the soft decision read operation in response to the soft decision read command. The hard decision operation may determine the programmed data, random data, for example 1 or 0, based on "on" state and "off" state of the cell. The hard decision data may be restored to the original data by random data interface 36.

Further, the soft decision operation may not read the programmed data, or random data.

The soft decision read operation is performed to generate the reliability information corresponding to the hard decision data. Referring to FIG. 3, in case of 2-bit soft decision data 1 indicates that the reliability corresponding to the hard decision data is strong, and 0 indicates that the reliability corresponding to the hard decision data is weak.

As described above, if the soft decision data may be restored by the random data interface 36, the reliability information corresponding to the hard decision data may be distorted. Thus when the soft decision read operation is performed or when the soft decision read command is applied to the non-volatile memory device, the soft decision data may be not de-randomized under the control of the control logic 31.

Figure 8:
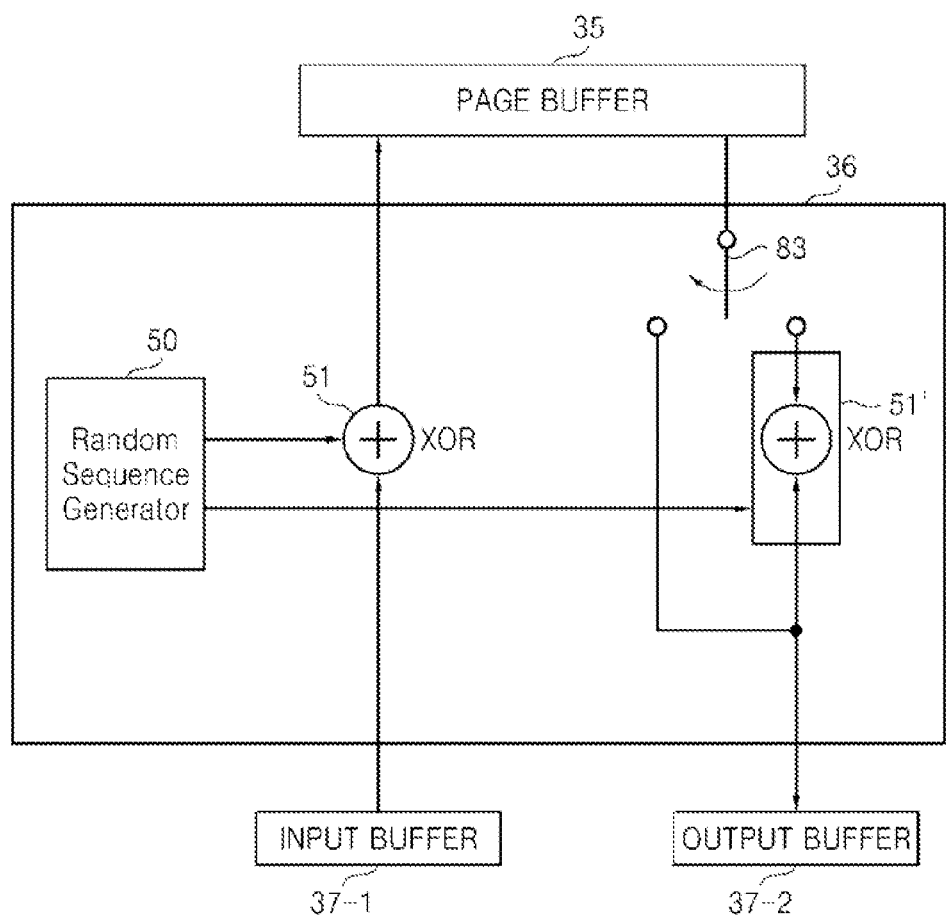
FIG. 8 is a block diagram illustrating a detailed structure of random data interface of non-volatile memory device of FIG. 7.

FIG. 8 is a block diagram illustrating a detailed structure of random data interface 36 of non-volatile memory device 30 shown in FIG. 7.

The random data interface 36 may include random sequence generator 50 and XOR gates 51, 51' under the control of the control logic 31. The random sequence generator 50 is configured to generate the random sequence.

When the program operation is performed, the random data interface 36 may receive the programming data through the input buffer 37-1. The XOR gate 51 is configured to perform XOR operation using the programming data and the random sequence to generate the random data. The random data may be loaded to the page buffer 35 and be programmed to the memory cell array 34.

When the hard decision read operation is performed, the page buffer 35 may sense the memory cells states, "on" or "off" and determine the hard decision data to be 1 or 0. The hard decision data may be provided to the random data interface 36. The random data interface 36 may de-randomize the hard decision data based on XOR operation using the hard decision data and the random sequence.

When the soft decision read operation is performed or the soft decision read command is applied to the non-volatile memory device 30, the soft decision data may bypass the XOR gate 51', under the control of the control logic 31 and the soft decision data is provided to the output buffer 37-2. The soft decision data may not restored by the random data interface 36 under the control of the control logic 31.

The random data interface 36 may include the switch 83 may be switched in response of a switching (or control) signal from the control logic 31 and the switch 83 may enable the soft decision read data to bypass the XOR '51. For example, the switch 83 may be automatically switched at a specific period of time after the soft decision read command is received by the random data interface 36. The switch 83 may be switched based on a stop signal applied when the soft decision read data is output under the control of the control logic 31.

Figure 9:
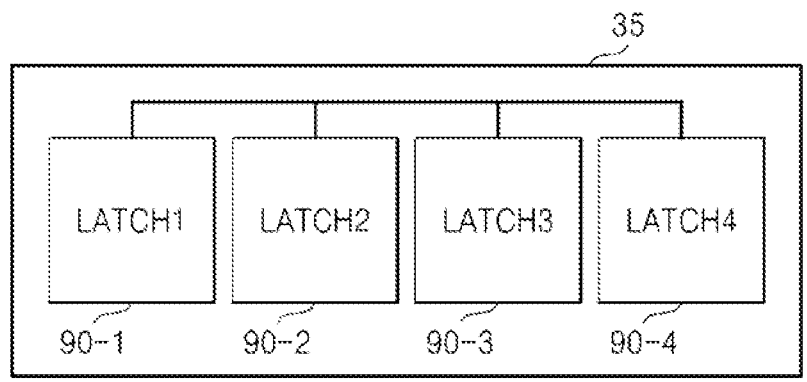
FIG. 9 is a block diagram illustrating a detailed structure of page buffer of non-volatile memory device of FIG. 7.

FIG. 9 is a block diagram illustrating a detailed structure of page buffer 35 of non-volatile memory device 30 in FIG. 7.

Referring to FIG. 9, each page buffer 35 may include, for example, a plurality of latches 90-1, 90-2, 90-3, 90-4. Four latches 90-1, 90-2, 90-3, 90-4 are electrically connected.

A first latch 90-1 may be sense latch which may sense the memory cell's state, on or off. A second latch 90-2 may be a first data latch which may store a specific binary bit, for example, least significant bit (LSB) data. A third latch 90-3 may be a second data latch which may store a specific binary bit, for example, most significant bit (MSB) data. And a forth latch 90-4 may store an input data or an output data. The page buffer 35 may perform XOR operation or XNOR operation based on a combination of a plurality of latches 90-1, 90-2, 90-3, 90-4 under the control of the control logic 31.

For example, referring to FIG. 2, FIG. 7 and FIG. 9, the first soft decision read value (2-2) may be stored into the second latch 90-2 and the second soft decision read value (2-3) may be stored into the third latch 90-3. The page buffer 35 may perform XNOR operation based on the combination of the second latch 90-2 and the third latch 90-3 under the control of the control logic 31. Then the page buffer 35 may generate the soft decision data (2-4).

Figure 10:
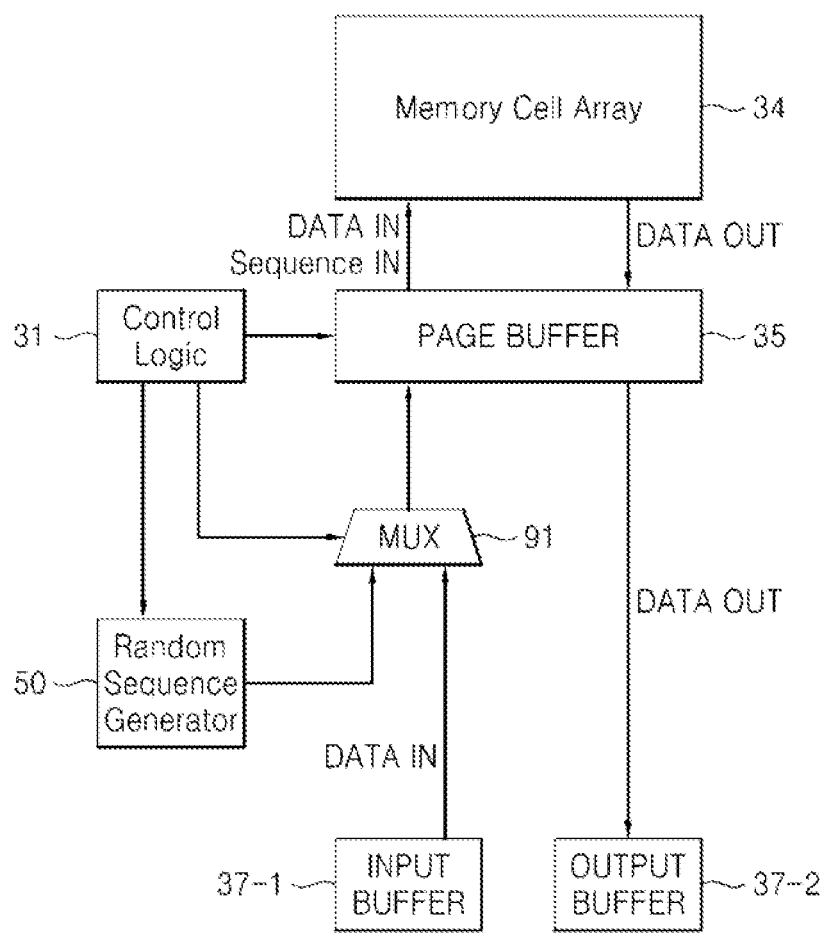
FIG. 10 is a block diagram illustrating non-volatile memory device according to another exemplary embodiment.

FIG. 10 is a block diagram illustrating non-volatile memory device 30 according to another exemplary embodiment.

Referring to FIG. 10, non-volatile memory system 10 may include the control logic 31, the page buffer 35, the random sequence generator 50, a multiplexer 91 configured to provide the page buffer 35 with the data (data in) and the random sequence (RS), and the page buffer 35 configured to perform XOR operation using the data and the random sequence.

The random sequence generator 50 may be controlled by the control logic 31. Under the control of the control logic 31, the random sequence generator 50 may generate the random sequence (RS) and provide the multiplexer 91 with the random sequence. As described above, the random sequence generator 50 may generate, for example, the binary bit sequence. The multiplexer 91 may be connected to the random sequence generator 50, input buffer 37-1 and the page buffer 35. The multiplexer 91 may be controlled by the control logic 31. The multiplexer 91 may provide the page buffer 35 with the data from the input buffer 37-1.

When the program operation is performed, the multiplexer 91 may provide the page buffer 35 with the data to be programmed and the random sequence.

Referring to FIGS. 7 and 10, the page buffer 35 may include for example, a plurality of latches 90-1, 90-2, 90-3, 90-4. The plurality of latches 90-1, 90-2, 90-3, 90-4 are electrically connected.

The page buffer 35 may include at least one data latch 90-1 which may store the data to be programmed. The page buffer 35 may include at least the other latch 90-2 which may store the random sequence. The page buffer 35 is configured to perform XOR operation using the data to be programmed in the one data latch 90-1 and the random sequence in the other latch 90-2 under the control of the control logic 31. And the page buffer 35 may generate the random data to be programmed as a result the XOR operation. The page buffer 35 may include another latch 90-3 which may store the random data.

In a manner similar to the programming operation, the page buffer 35 may perform the XOR operation when the read operation is performed. When data sensing and amplifying operation is finished, the page buffer 35 may perform the XOR operation using the random data and the random sequence. In other words, the page buffer 35 may de-randomize the random data and restore the random data to the original data.

In other words, the control logic 31 may control the page buffer 35 to perform randomizing or de-randomizing.

As described above, when the hard decision read operation is performed, the page buffer 35 may sense the memory cells states, "on" or "off" and determine the hard decision data, 1 or 0. The page buffer 35 may de-randomize the hard decision data based on XOR operation using the hard decision data and the random sequence.

When the soft decision read operation is performed or the soft decision read command is applied to the non-volatile memory device 30, the page buffer may not de-randomize under the control of the control logic 31. The page buffer 35 may provide the output buffer 37-2 with the soft decision data.

Referring to FIG. 10, the multiplexer 91 may not provide the page buffer 35 with the random sequence when the soft decision read operation is performed or the soft decision read command is applied to the non-volatile memory device 30. Even if the random sequence is provided to the page buffer 35, a plurality of latches 90-1, 90-2, 90-3, 90-4 in the page buffer 35 may be controlled in order not to perform XOR operation using the random sequence.

Referring to FIG. 2, the first soft decision read value (2-2) may be stored into the first data latch 90-2 and the second soft decision read value (2-3) may be stored into the second data latch 90-3. The page buffer 35 may perform XNOR operation based on the combination of the first data latch 90-2 and the second data latch 90-3 under the control of the control logic 31. Then the page buffer 35 may generate the soft decision data (2-4). Referring to FIG. 10, non-volatile memory device is configured by a plurality of package types. According to an exemplary embodiment, the non-volatile memory device 30 and the controller 40 may use, for example, PoP(Package on Package), Ball grid arrays(B-GAs), Chip scale packages(CSPs), Plastic Leaded Chip Carrier(PLCC), Plastic Dual In-Line Package(PDIP), Die in Waffle Pack, Die in Wafer Form, Chip On Board(COB), Ceramic Dual In-Line Package(CERDIP), Plastic Metric Quad Flat Pack(MQFP), Thin Quad Flatpack(TQFP), Small Outline(SOIC), Shrink Small Outline Package(SSOP), Thin Small Outline(TSOP), Thin Quad Flatpack(TQFP), System In Package(SIP), Multi Chip Package(MCP), Wafer-level Fabricated Package(WFP), Wafer-Level Processed Stack Package(WSP) etc.

Figure 11:
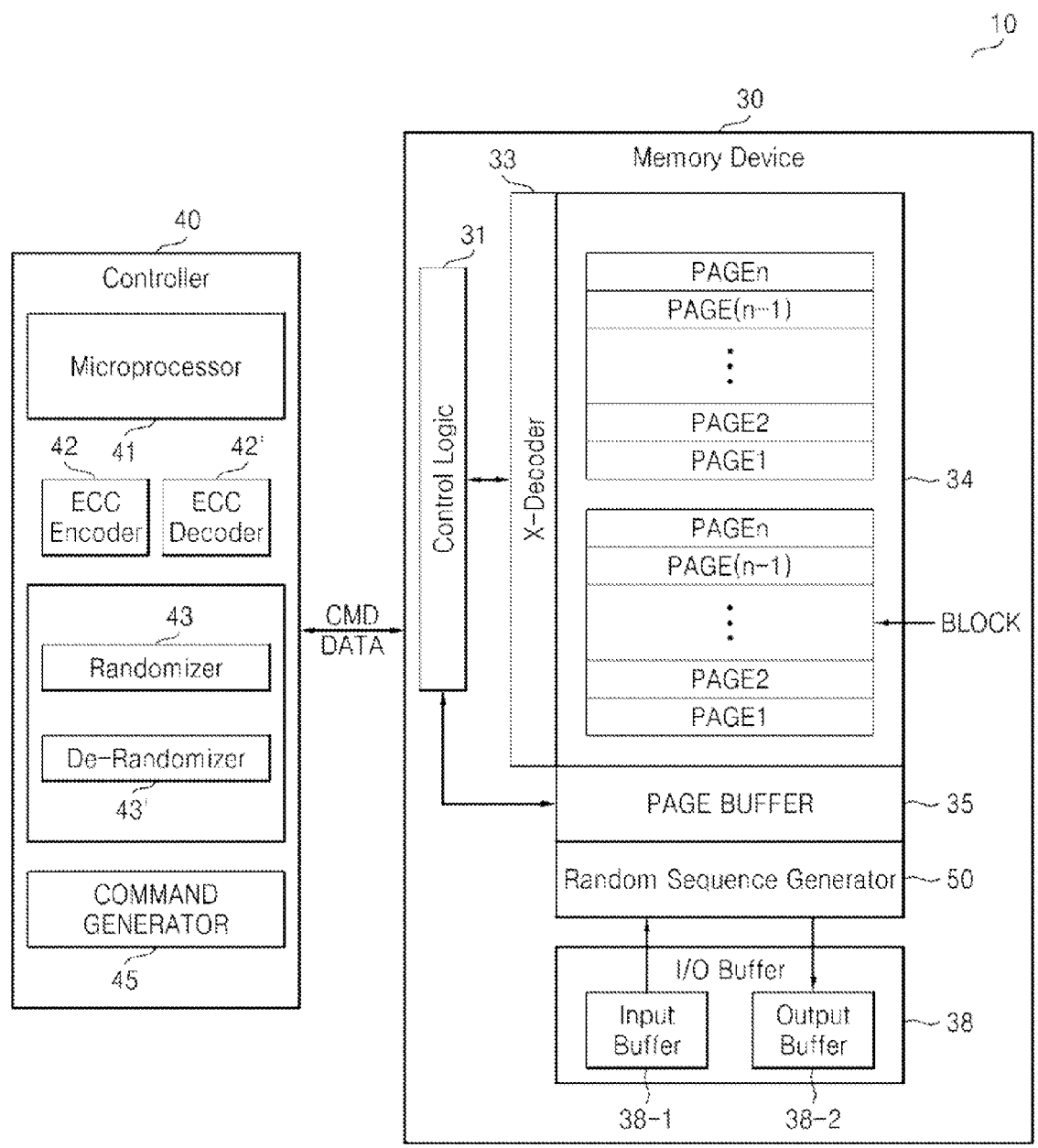
FIG. 11 is a block diagram illustrating non-volatile memory system according to another exemplary embodiment.

FIG. 11 is a block diagram illustrating non-volatile memory system according to another exemplary embodiment.

Memory system 10 includes a memory controller 40 and non-volatile memory device 30.

The memory controller 40 includes a microprocessor 41, an ECC encoder 24, an ECC decoder 42', a randomizer 43, a de-randomizer 43' and a command generator 45.

The microprocessor 41 may generally control the memory system 10.

The randomizer 43 and the de-randomizer 43' may be same as the randomizer and de-randomizer illustrated in FIG. 4, FIGS. 5A-C, and FIG. 6.

The ECC encoder 42 and the ECC decoder 42' may be same as the ECC encoder 42 and ECC decoder 42' shown in FIG. 4.

The command generator 45 may provide the non-volatile memory device 30 with a command under the control of the microprocessor 41.

The non-volatile memory device 30 includes a memory cell array 34, control logic 31, X-decoder 33, input/output buffer 38, random sequence generator 50, and a page buffer circuit 35. The memory cell array may include a plurality of memory blocks. A memory block may include a plurality of pages. The block is a unit for erase operation. The page is a unit for program and read operation. The control logic 31, the X-decoder 38, the page buffer circuit 35, and the random sequence generator 50 may has same function illustrated in FIG. 8, FIG. 9 and FIG. 10.

Referring to FIG. 4, FIG. 6, and FIG. 11, the random sequence generator 50 may be configured in the randomizer 43 which is also configured to be in the memory controller 40. Also, the random sequence generator 50 may be configured to be in the non-volatile memory device 30.

According to exemplary embodiments, randomizing operation may be performed in both randomizer 43 in the memory controller 40 and the non-volatile memory device 30.

Referring to FIGS. 5A, 5B, 5C and 11, the random sequence generator in the randomizer 43 may include more linear shift registers than the random sequence generator 50 in the non-volatile memory device 30. The random sequence provided by memory controller 40 may have a longer period than the random sequence provided by non-volatile memory device 30.

According to another exemplary embodiment, memory system 10 may select the memory controller side randomizing operation or the non-volatile side randomizing operation ("on chip randomizing").

At the beginning of the memory system 10 operations, memory system 10, for example, may select on chip randomizing operation because the random sequence generator 50 in the non-volatile memory device may have a shorter period.

According to another exemplary embodiment, memory system 10 may perform both memory controller side randomizing operation and on chip randomizing operation at the same time.

As described above, according to an exemplary embodiment, two types of read operation include the hard decision read operation and the soft decision read operation, as described above for FIGS. 2 and 3.

In case of hard decision read operation, the random data are read from the non-volatile memory device 30, which is called hard decision data. The hard decision data may be restored to the original data by de-randomizer 43'.

In case of soft decision read operation, the soft decision read operation may not read the programmed data, or random data. The soft decision read operation is performed to generate the reliability information corresponding to the hard decision data. In other words, the soft decision read operation may use the different read voltages from the hard decision read voltage and provide the reliability information corresponding to the hard decision data. Referring to FIG. 3, in case of 2-bit soft decision data, data 1 indicates that the reliability of the corresponding the hard decision data is strong, and data 0 indicates that the reliability of the corresponding hard decision data is weak. If the soft decision data is restored by de-randomizer 43', the reliability information corresponding to the hard decision data may be distorted. Thus the soft decision data may not be restored by de-randomizer 43' under the control of the microprocessor 41.

In the case of on chip randomizing operation, the soft decision data may not be restored by random sequence generator 50 under the control of control logic 31.

According to the exemplary embodiment in FIG. 11, the soft decision data may not be transformed and may not be applied to the de-randomizing operation.

Figure 12:
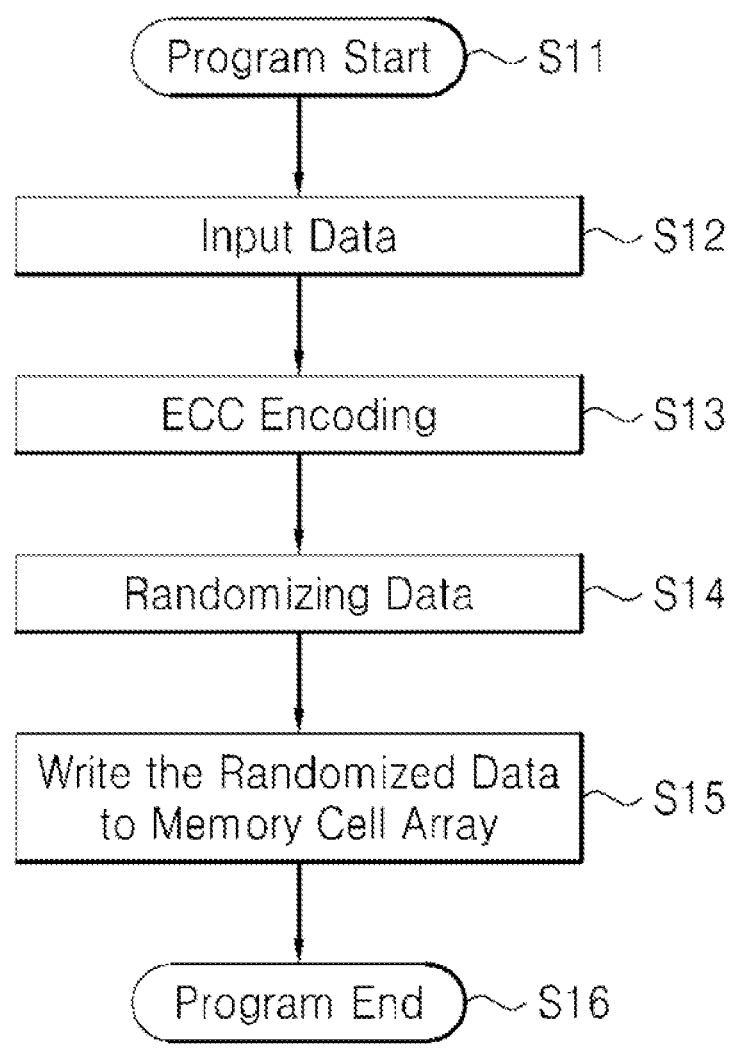
FIG. 12 is a flow chart of data programming according to an exemplary embodiment.

FIG. 12 is a flow chart of data programming according to an exemplary embodiment.

Referring to FIG. 1 through FIG. 12, the controller 40 may provide a program command to the non-volatile memory device under the control of the microprocessor 41 (S11).

The controller 40, for example, may receive the original data to be programmed from the host (S12).

The ECC encoder 42 may encode the original data and provide the randomizer with the original data (S13).

The randomizer 43 is configured to randomize the original data to generate the random data (S14).

As described above, FIG. 4 through FIG. 11 may indicate randomizing process.

The controller 40 may provide the random data to the non-volatile memory device 30. The non-volatile memory device 30 may program the random data to memory cell array 34 under the control of the control logic 31 (S15). Then the programming may be finished (S16).

Figure 13:
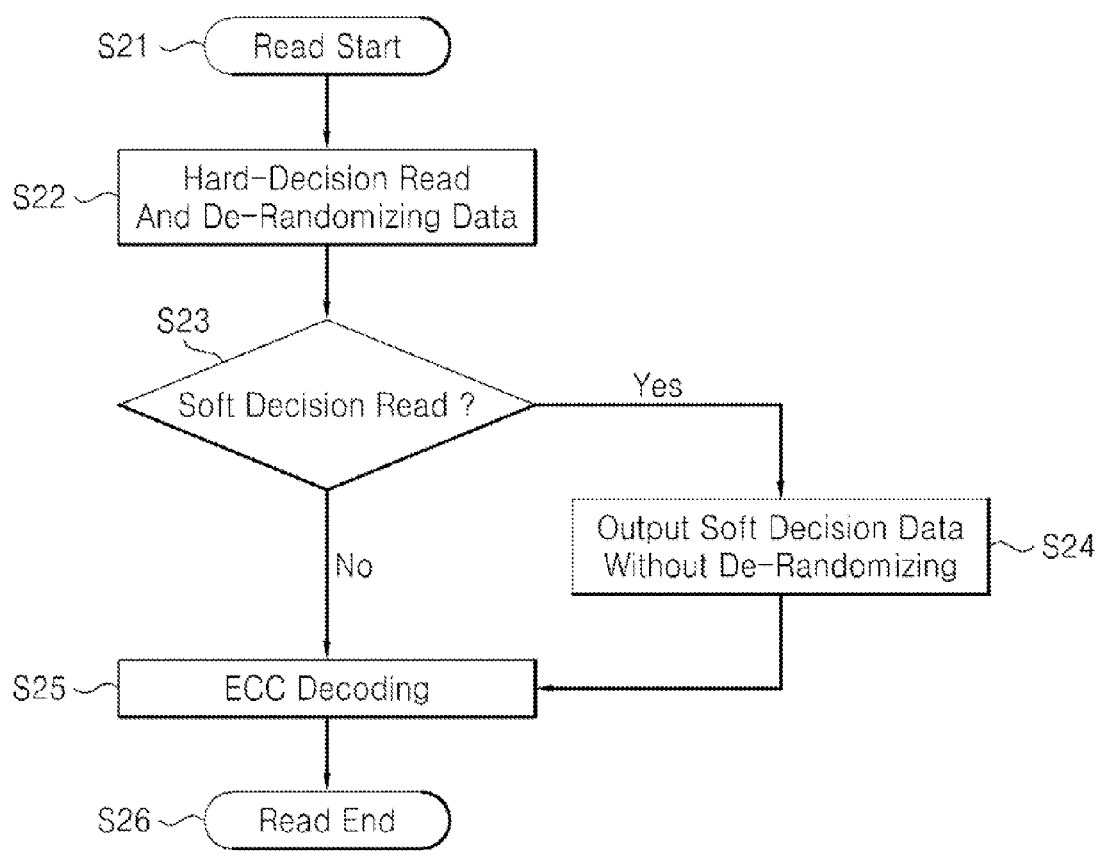
FIG. 13 is a flow chart of data reading according to an exemplary embodiment.

FIG. 13 is a flow chart of data reading according to an exemplary embodiment.

The controller 40 may provide the read command to the non-volatile memory device under the control of the microprocessor 41 (S21). In detail, the controller 40 may provide the hard decision read command to the non-volatile memory device 30.

The controller 40 may receive the random data from memory cell array 34 in response to the hard decision read command.

The de-randomizer 43' may de-randomize the random data to generate original data and may provide the restored data to the ECC decoder 43' (S22).

And, the controller 40 may also provide the non-volatile memory device 30 with the soft decision read command (S23).

In case that the soft decision read command is not provided, the ECC decoder may decode using the restored hard decision data and correct the error bits (S35). Then the reading operation is finished (S24).

When the controller 40 provide the soft decision read command to the non-volatile memory device 30 under the control of the microprocessor, the controller 40 may receive the soft decision data from the non-volatile memory device 30.

As described above, the soft decision data may not be de-randomized and the soft decision data may be provided to the ECC decoder 42' (S24). The ECC decoder 43' may decode and correct the errors using re-randomized hard decision data and the soft decision data (S25). Then the reading operation is finished.

Figure 14:
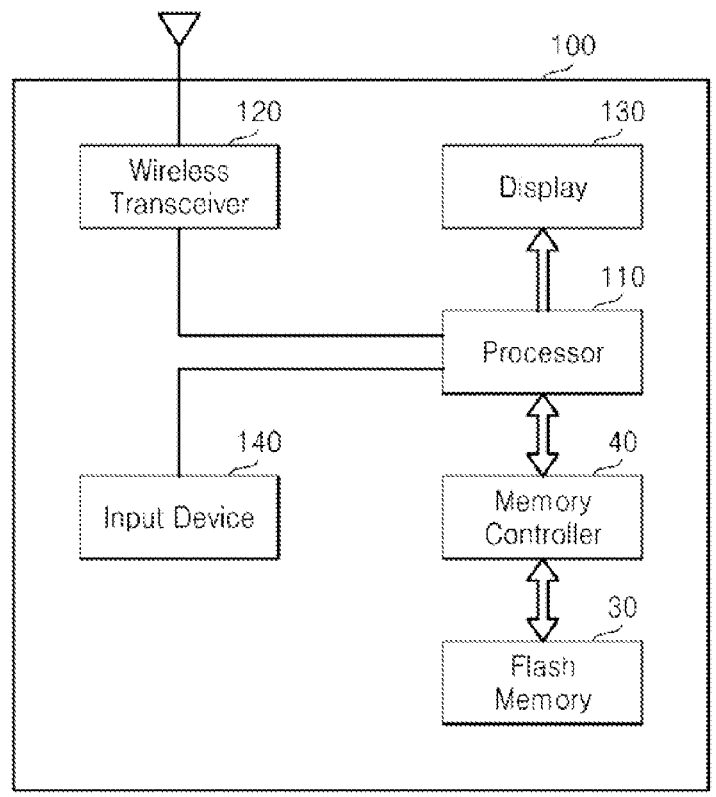
FIG. 14 is a block diagram of an electronic device including the non-volatile memory device according to an exemplary embodiment.

FIG. 14 shows a block diagram of an electronic device including the non-volatile memory device according to an exemplary embodiment.

Referring to FIG. 14, an electronic device 100 such as a cellular phone, a smart phone or a tablet PC may include a non-volatile memory device 30, which may be embodied in a flash memory device, and a memory controller 40, which may control an operation of the non-volatile memory device 30.

As illustrated in FIG. 14, the memory controller 40 is controlled by a processor 110 controlling an entire operation of an electronic device 100.

Data stored in the non-volatile memory device 30 may be displayed through a display 130 according to a control of the memory controller 40 operating according to a control of the processor 110.

A wireless transceiver 120 may transmit or receive a wireless signal through an antenna ANT. For example, the wireless transceiver 120 may convert a received wireless signal received through the antenna ANT to a signal which the processor 110 may process. Accordingly, the processor 110 may process a signal output from the wireless transceiver 120, and stores a processed signal in the non-volatile memory device 30 through the memory controller 40 or display it through the display 130.

The wireless transceiver 120 may convert a signal output from the processor 110 to a wireless signal and output a converted wireless signal to outside through the antenna ANT.

An input device 140 is a device which may input a control signal for controlling an operation of the processor 110 or data to be processed by the processor 110, and it may be embodied in a pointing device such as a touch pad, a computer mouse, a keypad or a keyboard.

The processor 110 may control the display 130 so that display data output from the non-volatile memory device 20, a wireless signal output from the wireless transceiver 120 or data output from the input device 140 may be displayed through the display 130.

Figure 15:
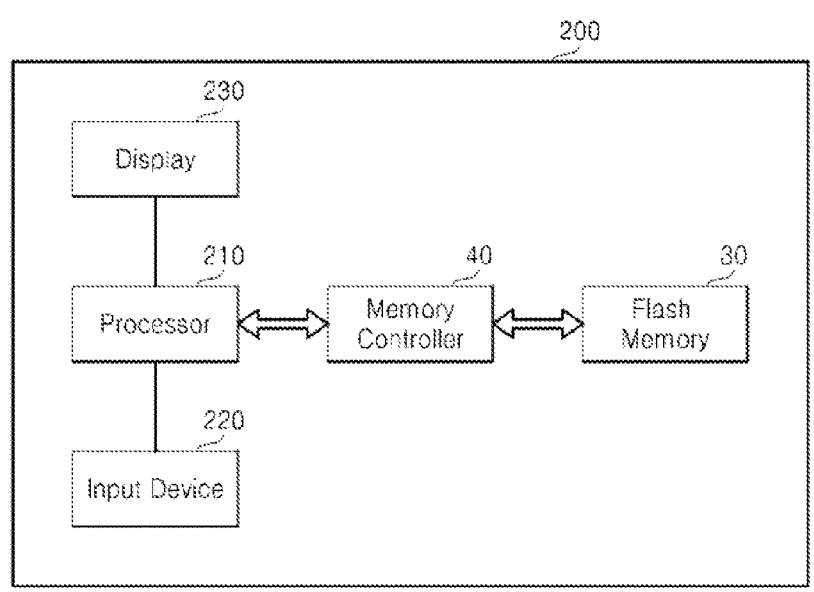
FIG. 15 is a block diagram of an electronic device including a non-volatile memory device according to another exemplary embodiment.

FIG. 15 shows a block diagram of an electronic device including a non-volatile memory device according to another exemplary embodiment.

Referring to FIG. 15, an electronic device 200, which may be embodied in a data processing device such as a personal computer PC, a tablet computer, a net-book, an e-reader, a personal digital assistant, a portable multimedia player, a MP3 player or a MP4 player, includes a non-volatile memory device 30 such as a flash memory device and a memory controller 40 controlling an operation of the non-volatile memory device 30.

The electronic device 200 may include a processor 210 for controlling the entire operation of the electronic device 200. The memory controller 250 is controlled by the processor 210.

The processor 210 may display data stored in the non-volatile memory device 30 through the display 230 according to an input signal generated by the input device 220. For example, the input device 220 may be embodied in a pointing device such as a touch pad, a computer mouse, a keypad or a keyboard.

Figure 16:
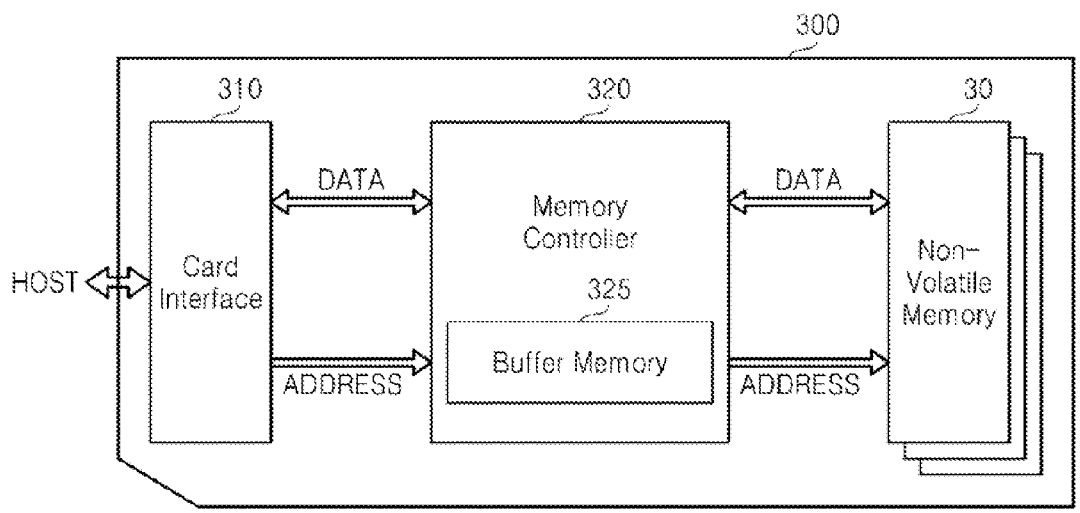
FIG. 16 is a block diagram of an electronic device including a non-volatile memory device according to another exemplary embodiment

FIG. 16 shows a block diagram of an electronic device including a non-volatile memory device 30 according to another exemplary embodiment.

Referring to FIG. 16, an electronic device 300 includes a card interface 310, a memory controller 320 and a non-volatile memory device 30, e.g., a flash memory device.

The electronic device 300 may transmit or receive data with a host through the card interface 310. According to an exemplary embodiment, the card interface 310 may be a secure digital (SD) card interface or a multi-media card (MMC) interface, however, it is not restricted thereto. The card interface 310 may interface a data exchange between the host and the memory controller 320 according to a communication protocol of the host which may communicate with the electronic device 300.

The memory controller 320 may control a general operation of the electronic device 300 and control a data exchange between the card interface 310 and the non-volatile memory device 30. In addition, a buffer memory 325 of the memory controller 320 may buffer data exchanged between the card interface 310 and a non-volatile memory device 30.

The memory controller 320 is connected to the card interface 310 and a non-volatile memory device 30 through a data bus and an address bus. According to an exemplary embodiment, the memory controller 320 receives an address of data to read or to write from the card interface 310 through the address bus and transmits it to the non-volatile memory device 30.

In addition, the memory controller 320 receives or transmits data to read or to write through a data bus connected to each of the card interface 310 and the non-volatile memory device 30. When an electronic device 300 of FIG. 16 is connected to a PC, a tablet PC, a digital camera, a digital audio player, a cellular phone, a console video game hardware or a host such as a digital set-top box, the host may transmit or receive data stored in the non-volatile memory device 30 through the card interface 310 and the memory controller 320.

Figure 17:
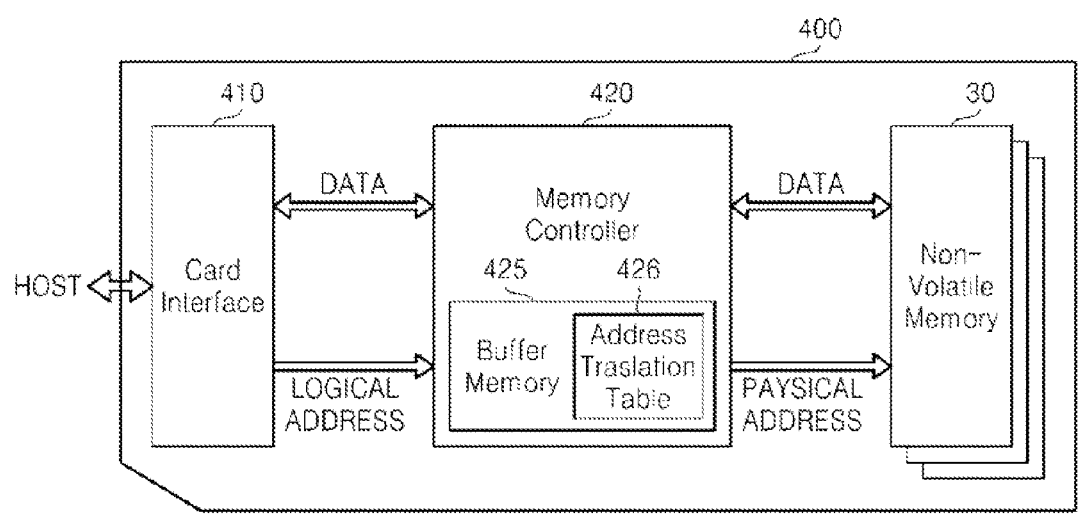
FIG. 17 is a block diagram of an electronic device including a non-volatile memory device according to still another exemplary embodiment.

FIG. 17 shows a block diagram of an electronic device including a non-volatile memory device according to still another exemplary embodiment.

Referring to FIG. 17, an electronic device 400 includes a card interface 410, a memory controller 420 and a non-volatile memory device 30, e.g., a flash memory.

An electronic device 400 may perform a data communication with a host through a card interface 410. According to an exemplary embodiment, the card interface 410 may be a SD card interface or a MMC interface; however, it is not restricted thereto. The card interface 410 may perform a data communication between a host and a memory controller 420 according to a communication protocol of a host which may communicate with the electronic device 400.

The memory controller 420 may control a general operation of the electronic device 400 and control a data exchange between the card interface 410 and the non-volatile memory device 30.

Moreover, a buffer memory 425 included in the memory controller 420 may store various data to control a general operation of the electronic device 400. A buffer memory 425 in the memory controller 40 may be connected to the card interface 410 and the non-volatile memory device 30 through a data bus and a logical address bus.

According to the exemplary embodiment, the memory controller 420 may receive an address of a read data or a write data from the card interface 410 through a logical address bus, and transmit it to the non-volatile memory device through a physical address bus.

Additionally, the memory controller 420 may receive or transmit a read data or a write data through a data bus connected to each of the card interface 410 and a non-volatile memory 30. According to the exemplary embodiment, the memory controller 420 of the electronic device 400 may include an address translation table 426 in a buffer memory 425. In the address translation table 426, a logical address input from outside and a logical address for accessing to the non-volatile memory 30 may be included. During a write operation, the memory controller 420 may write a new data in a certain physical address and update the address translation table 426.

In performing a read operation as well as a write operation, the memory controller 420 may select a physical address from the address translation table 426 by referring to a physical address of data where a write operation is performed.

The memory controller 420 may perform randomizing and de-randomizing as described above. When the electronic device 400 of FIG. 17 is connected to a PC, a tablet PC, a digital camera, a digital audio player, a cellular phone, a console video game hardware or a host such as a digital set-top box, the host may transmit or receive data stored in the non-volatile memory 30 through the card interface 410 and the memory controller 420.

Figure 18:
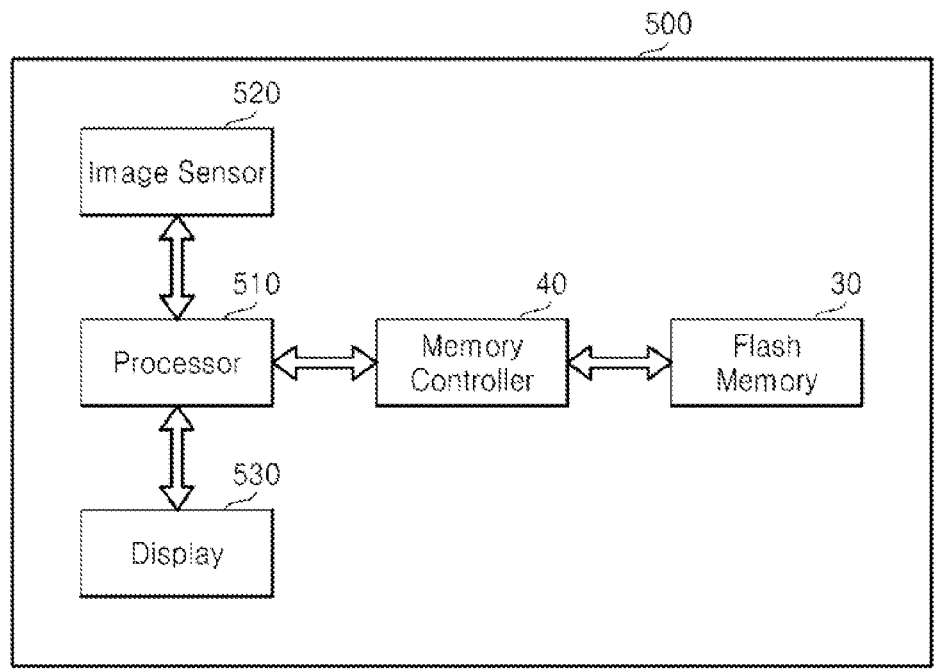
FIG. 18 is a block diagram of an electronic device including a non-volatile memory device according to still another exemplary embodiment.

FIG. 18 shows a block diagram of an electronic device including a non-volatile memory device according to still another exemplary embodiment.

Referring to FIG. 18, an electronic device 500 includes a non-volatile memory device 30 such as a flash memory device, a memory controller 40 for controlling a data processing operation of the non-volatile memory device 30, and a processor 510 controlling a general operation of the electronic device 500.

An image sensor 520 of the electronic device 500 converts an optical signal into a digital signal, and is stored in the non-volatile memory device 30 or displayed through the display 530 under a control of the processor 510. In addition, a digital signal stored in the non-volatile memory device 30 is displayed through the display 530 under a control of the processor 510.

Figure 19:
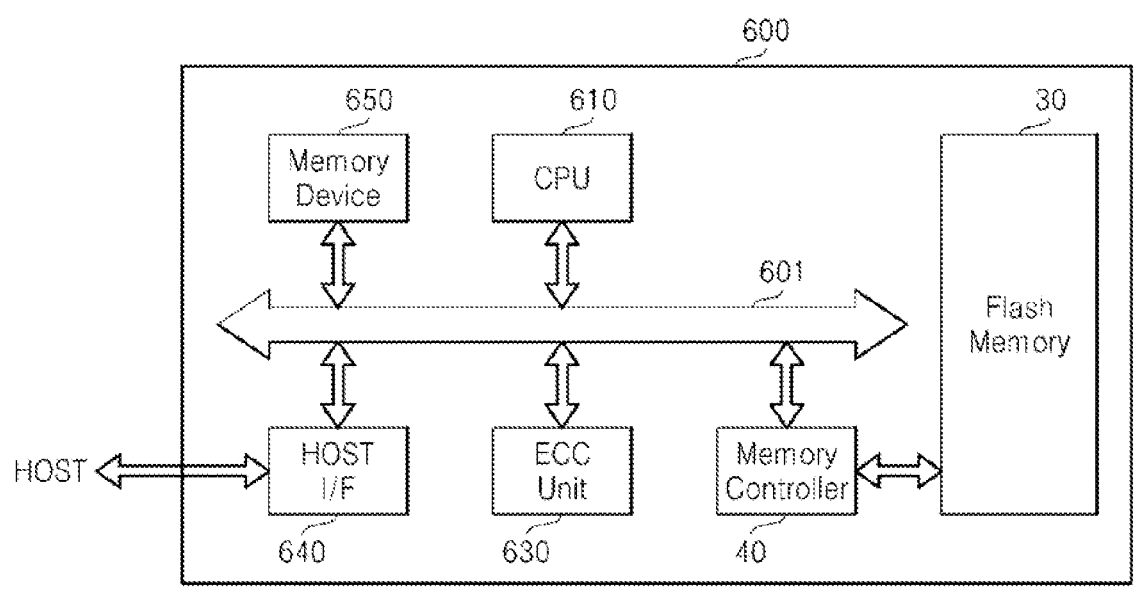
FIG. 19 shows a block diagram of an electronic device including a non-volatile memory device such as a flash memory device according to still another exemplary embodiment.

FIG. 19 shows a block diagram of an electronic device including a non-volatile memory device such as a flash memory device according to still another exemplary embodiment.

Figure 20:
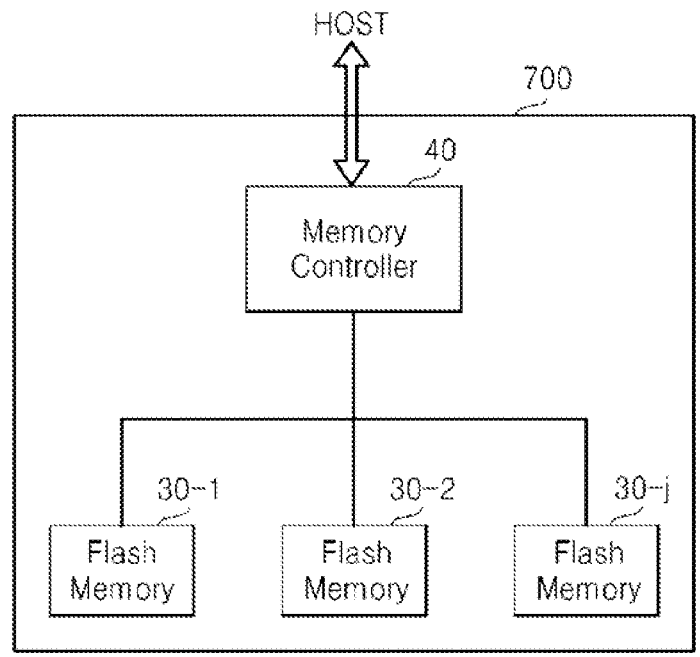
FIG. 20 shows a block diagram of an electronic device including a non-volatile memory device according to still another exemplary embodiment.

FIG. 20 shows a block diagram of an electronic device including a non-volatile memory device according to still another exemplary embodiment.

Referring to FIG. 20, an electronic device 700 may be embodied in a data storage device such as a solid state drive (SSD).

The electronic device 700 may include a plurality of non-volatile memory devices 30-1 to 30-j and a memory controller 40 controlling a data processing operation of each of the plurality of non-volatile memory devices 30-1 to 30-j.

The electronic device 700 may be embodied in a memory system or a memory module. According to the exemplary embodiment, the memory controller 40 may be embodied inside or outside the electronic device 700.

Figure 21:
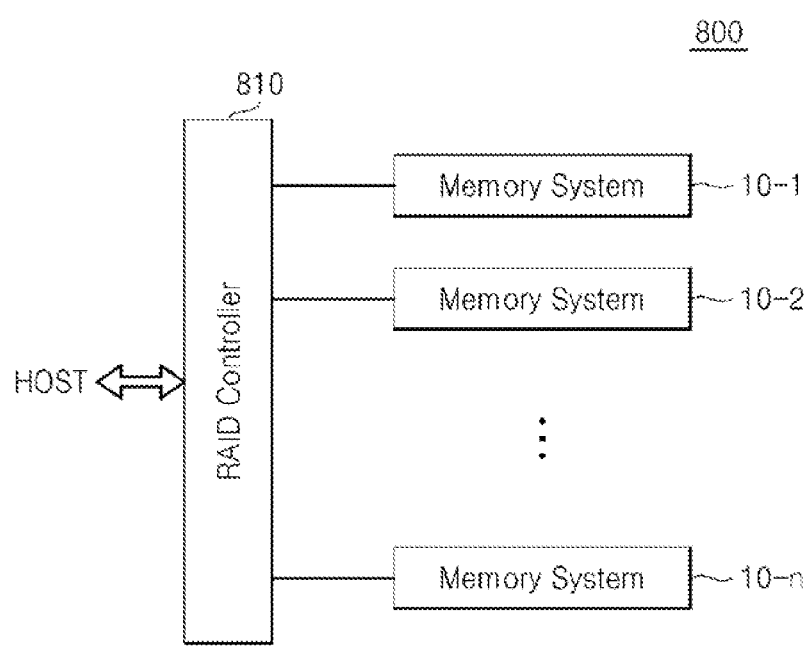
FIG. 21 shows a block diagram of a data storage device including the memory system of FIG. 4 according to another exemplary embodiment.

FIG. 21 shows a block diagram of a data processing system including an electronic device illustrated in FIG. 20.

Referring to FIGS. 20 and 21, a data storage device 800 which may be embodied in a redundant array of independent disks (RAID) system may include a RAID controller 810 and a plurality of memory systems 10-1 to 10-n, where n is a natural number.

Each of the plurality of memory systems 10-1 to 10-n may be an electronic device 700 illustrated in FIG. 4. The plurality of memory systems 10-1 to 10-n may compose a RAID array. The data storage device 800 may be embodied in a personal computer (PC) or a SSD.

During a program operation, the RAID controller 810 may output a program data output from a host to one of the plurality of memory systems 10-1 to 10-n according to one of a plurality of RAID levels selected based on a RAID level information output from the host. Additionally, during a read operation, the RAID controller 810 may transmit data read from one of the plurality of memory systems 10-1 to 10-n to the host according to one of a plurality of RAID levels selected based on a RAID level.

With the above, multi-level cells with increased reliability and decreased read failure rates are achieved by using soft decision data which indicate the reliability of the hard decision data. The soft decision data which has not been de-randomized, is used to decode the hard decision data.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A method of operating a nonvolatile memory system, the method comprising:
reading randomized data stored at an address in a non-volatile memory using a first read voltage;
de-randomizing the randomized data using a random sequence generated by a random sequence generator, to generate de-randomized data;
performing soft decision read operation using a second read voltage and third read voltage, wherein the second read voltage and the third read voltage are different from the first read voltage and wherein the first read voltage is between the second read voltage and the third read voltage;
generating soft decision data indicating a reliability of the de-randomized data based on a result of the soft decision read operation; and
decoding the de-randomized data using the soft decision data.

2. The method of claim 1, wherein the de-randomizing comprises:
combining the randomized data with a first random sequence;
combining the soft decision data with a second random sequence; and
outputting the de-randomized data and the soft decision data, and
wherein second random sequence is a sequence of only bit values of zero.

3. The method of claim 1, further comprising:
controlling a switch configured to control a datapath in one of a first mode and a second mode, wherein the switch is controlled to transmit the randomized data on a datapath to a de-randomizer in the first mode and bypass transmission of the soft decision data on the datapath to the de-randomizer in the second mode.

4. The method of claim 3, wherein the de-randomizer comprises a logic gate configured to receive the random sequence and combine the random sequence with the randomized data to output de-randomized data in the first mode, and wherein the soft decision data bypasses the logic gate in the second mode.

5. The method of claim 4, wherein the logic gate is an exclusive-OR (XOR) logic gate.

6. The method of claim 5, wherein the switch is configured to receive the randomized data and the soft decision data from a page buffer.

7. The method of claim 6, further comprising:
outputting the de-randomized data and the soft decision data bypassing the logic gate to a buffer.

8. The method of claim 1, further comprising:
inputting the randomized data and the read soft decision data to a page buffer,
and wherein the de-randomizing is performed at the page buffer based on the random sequence.

9. The method of claim 8, wherein the random sequence is not received by the page buffer when the soft decision data is received by the page buffer.

10. The method of claim 8, wherein the random sequence is received by the page buffer when the soft decision data is received by the page buffer, and
wherein the random sequence is not combined with the soft decision data at the page buffer.

11. The method of claim 1, wherein the nonvolatile memory system comprises a controller and a flash memory, and
wherein the de-randomizing is performed by at least one of the controller and the flash memory.

12. The method of claim 1, wherein the decoding uses low density parity check code.

13. A memory controller comprising:
a microprocessor;
a de-randomizer configured to receive a hard decision read command to de-randomize randomized data read from at an address in a non-volatile memory using a first read voltage according to a random sequence generated by a random sequence generator, and de-randomize the randomized data, in response to receiving the hard decision read command, under a control of the microprocessor; and
a decoder configured to decode the de-randomized data using soft decision data indicating a reliability of the de-randomized data generated using a second read voltage and a third read voltage, wherein the second read voila and the third read voltage are different from the first read voltage, and wherein the first read voltage is between the second read voltage and the third read voltage.

14. The memory controller of claim 13, further comprising:
a switch configured to provide the randomized data along a datapath to the de-randomizer and to provide the soft decision data along a datapath that bypasses the de-randomizer.

15. The memory controller of claim 13, wherein the de-randomizer is further configured to receive the randomized data and the soft decision data, and to combine the randomized data with a first random sequence and combine the soft decision data with a second random sequence, and
wherein second random sequence is a sequence of only bit values of zero.

16. The memory controller of claim 15, wherein the de-randomizer comprises a plurality of linear feedback shift registers.

17. The memory controller of claim 13, wherein the decoder uses low density parity check code.

18. A non-volatile memory system comprising the memory controller of claim 13 and a non-volatile memory configured to store the randomized data.

19. A non-volatile memory system comprising:
control logic; and
a non-volatile memory comprising:
a non-volatile memory cell array configured to store randomized data;
a page buffer configured to receive randomized data stored at an address in a non-volatile memory as a result of read data using a first read voltage and soft decision values as the results of read operation using a second read voltage and a third read voltage, from the non-volatile memory cell array, wherein the second read voltage and the third read voltage are different from the first read voltage, and wherein the first read voltage is between the second read voltage and the third read voltage;
a random sequence generator configured to generate a random sequence;
a multiplexer configured to receive the random sequence and output the random sequence;
wherein the page buffer is configured to de-randomize the first value of the randomized data based on the random sequence, output the de-randomized data, generate soft decision data indicating a reliability of the de-randomized data based on a result of soft decision values, and output the soft decision data.

20. The non-volatile memory system of claim 19, wherein the multiplexer does not output the random sequence to the page buffer when the soft decision data is generated from the second values read from the non-volatile memory cell array.

21. The non-volatile memory system of claim 19, wherein the page buffer comprises:
a plurality of latches,
wherein the multiplexer is configured to output the random sequence to the page buffer when the soft decision data is generated from the second values read from the non-volatile memory cell array, and
wherein the plurality of latches are configured so that an exclusive-OR (XOR) operation is not performed between the soft decision data and the random sequence.

* * * * *